(12) United States Patent
Takada et al.

(10) Patent No.: US 11,314,095 B2
(45) Date of Patent: Apr. 26, 2022

(54) OPTICAL PATTERN GENERATION DEVICE

(71) Applicant: MITSUBISHI ELECTRIC CORPORATION, Tokyo (JP)

(72) Inventors: Yukari Takada, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 245 days.

(21) Appl. No.: 16/498,125

(22) PCT Filed: May 22, 2017

(86) PCT No.: PCT/JP2017/018983
§ 371 (c)(1),
(2) Date: Sep. 26, 2019

(87) PCT Pub. No.: WO2018/216057
PCT Pub. Date: Nov. 29, 2018

(65) Prior Publication Data
US 2020/0103667 A1     Apr. 2, 2020

(51) Int. Cl.
*G02B 27/09* (2006.01)
(52) U.S. Cl.
CPC ..... *G02B 27/0944* (2013.01); *G02B 27/0927* (2013.01)
(58) Field of Classification Search
CPC .. G02B 27/0944; G02B 27/0927; G02B 5/18; G02B 27/42
See application file for complete search history.

(56) References Cited

U.S. PATENT DOCUMENTS 4,786,124 A   11/1988  Stone et al.
5,774,239 A    6/1998  Feldman et al.
(Continued)

FOREIGN PATENT DOCUMENTS

CN    105372826 A    3/2016
JP    2013-33204 A   2/2013
JP    2014-209237 A  11/2014

OTHER PUBLICATIONS

Office Action dated Nov. 9, 2020 in corresponding European Patent Application No. 17 910 715.6.
(Continued)

*Primary Examiner* — Darryl J Collins
*Assistant Examiner* — Matthew Y Lee
(74) *Attorney, Agent, or Firm* — Birch, Stewart, Kolasch & Birch, LLP

(57) ABSTRACT

An optical pattern generation device includes: a first laser light source for emitting first laser light; a first diffractive optical element for changing a phase of the first laser light depending on a position on a plane perpendicular to a propagating direction of the first laser light, and emitting laser light having a phase distribution; a second diffractive optical element for changing a phase of incident laser light depending on a position on a plane perpendicular to a propagating direction of the incident laser light, and emitting laser light for forming an optical pattern; and a transfer optical system disposed between the first and second diffractive optical elements, for transferring the phase distribution of the laser light emitted from the first diffractive optical element to a phase distribution of laser light incident on the second diffractive optical element.

6 Claims, 7 Drawing Sheets

(56) References Cited

U.S. PATENT DOCUMENTS

| | | |
|---|---|---|
| 2006/0163463 A1* | 7/2006 | Grier .................... G03H 1/0808 |
| | | 250/251 |
| 2009/0185274 A1 | 7/2009 | Shpunt |
| 2010/0284082 A1 | 11/2010 | Shpunt et al. |
| 2011/0069389 A1 | 3/2011 | Shpunt |
| 2011/0075259 A1 | 3/2011 | Shpunt |
| 2013/0120841 A1 | 5/2013 | Shpunt et al. |
| 2013/0294468 A1* | 11/2013 | Sridharan ........... H01S 3/10053 |
| | | 372/29.02 |
| 2014/0293254 A1* | 10/2014 | Komatsuda ......... G03F 7/70058 |
| | | 355/67 |
| 2015/0346685 A1 | 12/2015 | Ito et al. |
| 2016/0100155 A1 | 4/2016 | Shpunt et al. |
| 2017/0116757 A1 | 4/2017 | Shpunt et al. |

OTHER PUBLICATIONS

Extended European Search Report for European Application No. 17910715.6, dated Apr. 1, 2020.
Office Action dated Mar. 22, 2021 in corresponding Chinese Patent Application No. 201780090519.5 with an English Translation.

* cited by examiner

OPTICAL PATTERN GENERATION DEVICE

TECHNICAL FIELD

The present invention relates to an optical pattern generation device that generates optical patterns.

BACKGROUND ART

Diffractive optical elements (DOEs) that each convert incident light into a desired pattern have been used in various optical devices and the like. Typical applications include material processing, printing, optical measurement, illumination, etc. For example, in a laser beam machine, a diffractive optical element has a function of making an incident beam branch into a plurality of beams. In addition, with positions and intensities of branching beams being designed, diffractive optical elements are also used in lighting systems that generate desired patterns.

A diffractive optical element is an element having periodically patterned slits or irregularities on a substrate, and uses diffracted light generated by the influence of the slits or irregularity pattern to convert incident light into light with a target intensity distribution or phase distribution. In particular, a phase-type diffractive optical element converts the phase distribution of incident light into a phase distribution that forms a desired pattern on an image surface, which results in much higher energy efficiency of converted light with respect to incident light than that of an amplitude-type diffractive optical element. Phase-type diffractive optical elements are therefore used not only as diffractive optical elements with simple patterns for providing uniform intensity distributions but also as diffractive optical elements generating diffraction patterns of complicated patterns.

Examples of optical pattern generation devices in which diffractive optical elements of the related art are used include one device including one diffractive optical element and generating one pattern. In addition, the examples include one device which includes two diffractive optical elements, and in which light from a light source is transmitted through the two diffractive optical elements, thereby generating a pattern so as to diffract the light at an angle larger than that of diffraction by one diffractive optical element (Patent Literature 1, for example). The surface irregularity patterns of such diffractive optical elements are each designed so that a desired pattern is formed on an image surface by using a specific wavelength.

CITATION LIST

Patent Literature

Patent Literature 1: JP 2014-209237 A

SUMMARY OF INVENTION

Technical Problem

In an optical pattern generation device of the related art including two diffractive optical elements, it is necessary to obtain the distribution of light incident on the second diffractive optical element in view of a change in a wavefront due to propagation of light emitted from the first diffractive optical element, and design the surface irregularity pattern of the second diffractive optical element depending on the distribution of light incident on the second diffractive optical element. This causes problems in that the design and the manufacture of the surface pattern of the second diffractive optical element are complicated.

The present invention has been made to solve such problems as described above, and an object thereof is to provide an optical pattern generation device enabling a second diffractive optical element to be simply designed without consideration of a change in a wavefront due to propagation of light emitted from a first diffractive optical element.

Solution to Problem

An optical pattern generation device according to the present invention includes: a first laser light source to emit first laser light; a first diffractive optical element to change a phase of the first laser light depending on a position on a plane perpendicular to a propagating direction of the first laser light, and emit laser light having a phase distribution; a second diffractive optical element to change a phase of incident laser light depending on a position on a plane perpendicular to a propagating direction of the incident laser light, and emit laser light for forming an optical pattern; and a transfer optical system disposed between the first and second diffractive optical elements, to transfer the phase distribution of the laser light emitted from the first diffractive optical element to a phase distribution of laser light incident on the second diffractive optical element.

Advantageous Effects of Invention

According to the present invention, a second diffractive optical element can be simply designed without consideration of a change in a wavefront due to propagation of light emitted from a first diffractive optical element.

DESCRIPTION OF EMBODIMENTS

First Embodiment

Embodiments of the present invention will now be described.

Figure 1:
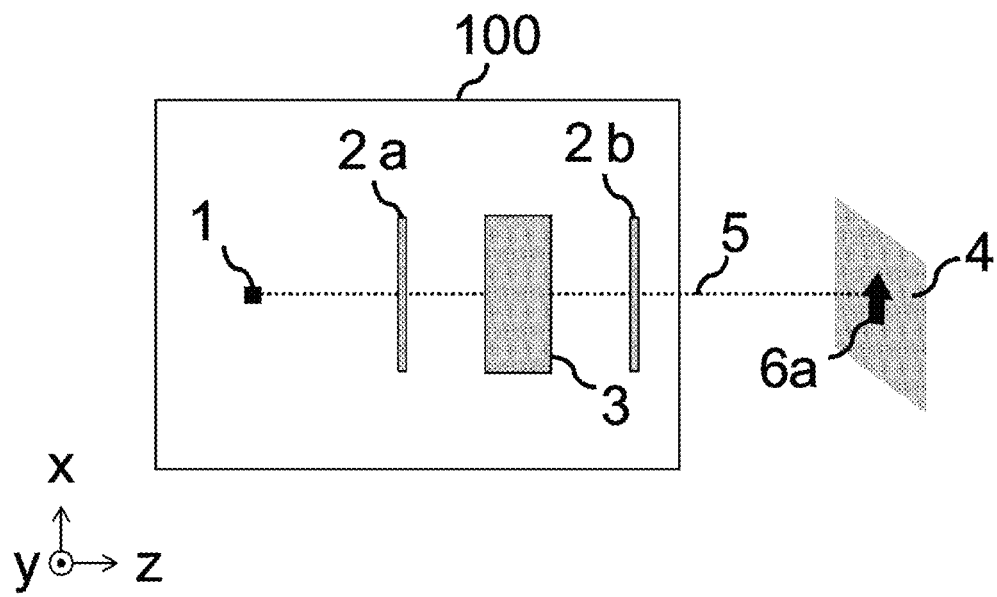
FIG. 1 illustrates an example of a configuration of an optical pattern generation device 100 according to a first embodiment.

FIG. 1 is a diagram illustrating an example of a configuration of an optical pattern generation device 100 according to a first embodiment. The optical pattern generation device 100 includes a laser light source 1 that emits laser light, a diffractive optical element 2a that changes the phase of laser light emitted from the laser light source 1 depending on the position on a plane perpendicular to the propagating direction of the laser light and emits laser light with a phase distribution, a diffractive optical element 2b that changes the phase of the laser light incident thereon depending on the position on a plane perpendicular to the propagating direction of the incident laser light and emits laser light forming an optical pattern, and a transfer optical system 3 that is provided between the diffractive optical elements 2a and 2b and transfers the phase distribution of the laser light emitted from the diffractive optical element 2a to that of the laser light incident on the diffractive optical element 2b. The optical pattern generation device 100 generates an optical pattern 6a by projecting the laser light emitted from the diffractive optical element 2b onto an image surface 4. In FIG. 1, a direction perpendicular to the optical axis 5 of the laser light emitted from the laser light source 1 and parallel to the figure is referred to as x-axis direction, a direction perpendicular to the optical axis 5 of the laser light and perpendicular to the figure is referred to as y-axis direction, and a direction parallel to the optical axis 5 is referred to as z-axis direction. Note that in each of subsequent figures, the same reference numerals represent the same or corresponding components. The optical pattern generation device 100 is used as a laser device for lighting, for example.

The laser light source 1 is a light source that emits single-wavelength laser light. For the laser light source 1, a semiconductor laser, a fiber laser, or a solid-state laser is used, for example.

The diffractive optical elements 2a and 2b are elements each of which is made of glass or resin and has periodically patterned slits or irregularities on a substrate thereof, and convert light incident on the diffractive optical elements 2a and 2b so that diffracted light generated by the slits or irregularity patterns becomes light having a target intensity distribution on the image surface 4. Specifically, the diffractive optical elements 2a and 2b each change the intensity and the phase of laser light incident on a corresponding one of the diffractive optical elements 2a and 2b by the slits or irregularity pattern of the corresponding one of the diffractive optical elements 2a and 2b depending on the position on a plane perpendicular to the propagating direction of the incident laser light, and each emit laser light having an intensity distribution and a phase distribution. Note that the diffractive optical element 2a and the diffractive optical element 2b have respective surface irregularity patterns different from each other. As the surface patterns of the diffractive optical elements 2a and 2b are more continuous, that is, have more numbers of gradations, the diffraction efficiency is higher. In manufacturing, however, as the number of graduations is larger, processing becomes more difficult and the cost becomes higher.

Figure 2:
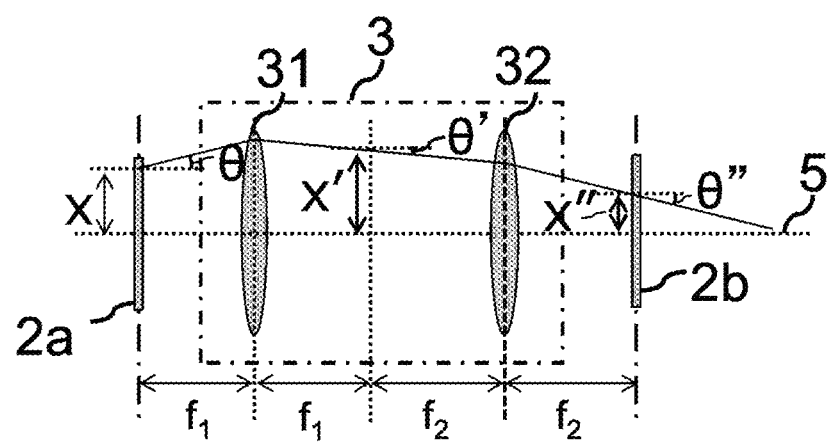
FIG. 2 illustrates an example of a configuration of a transfer optical system 3 according to the first embodiment.

The transfer optical system 3 is an optical system includes a plurality of optical lenses. FIG. 2 illustrates a configuration of the transfer optical system 3 including two lenses with focal distances of $f_1$ and $f_2$. The configuration of the transfer optical system 3 will be described with reference to FIG. 2. The focal distance of a lens 31 is represented by $f_1$, and the focal distance of a lens 32 is represented by $f_2$. In addition, the sides of the lenses 31 and 32 closer to the laser light source 1 will be referred to as front sides, and the sides thereof farther from the laser light source 1 will be referred to as rear sides. The diffractive optical element 2a is positioned at the front-side focal position of the lens 31, and the diffractive optical element 2b is positioned at the rear-side focal position of the lens 32. In this case, the distance between the lens 31 and the lens 32 is $f_1+f_2$, which is the sum of the respective focal distances.

Transmitted light that is transmitted by the diffractive optical element 2a at a position at a distance x in the x-axis direction from the optical axis 5 is incident on the lens 31 at an incidence angle θ. The light incident on the lens 31 at the incidence angle θ is refracted by the lens 31 at an angle of $θ'=x/f_1$ with respect to the optical axis 5. In addition, the light refracted by the lens 31 passes a position at a distance of $x'=θf_1$ from the optical axis 5 at the focal position on the emitting side of the lens 31. Thus, the lens 31 converts light emitted at the distance x from the optical axis 5 on the diffractive optical element 2a and at the angle θ with respect to the optical axis 5, into light at the distance $x'=θf_1$ from the optical axis 5 at the focal distance on the emitting side of the lens 31 and with the angle $θ'=x/f_1$ with respect to the optical axis 5.

Figure 3:
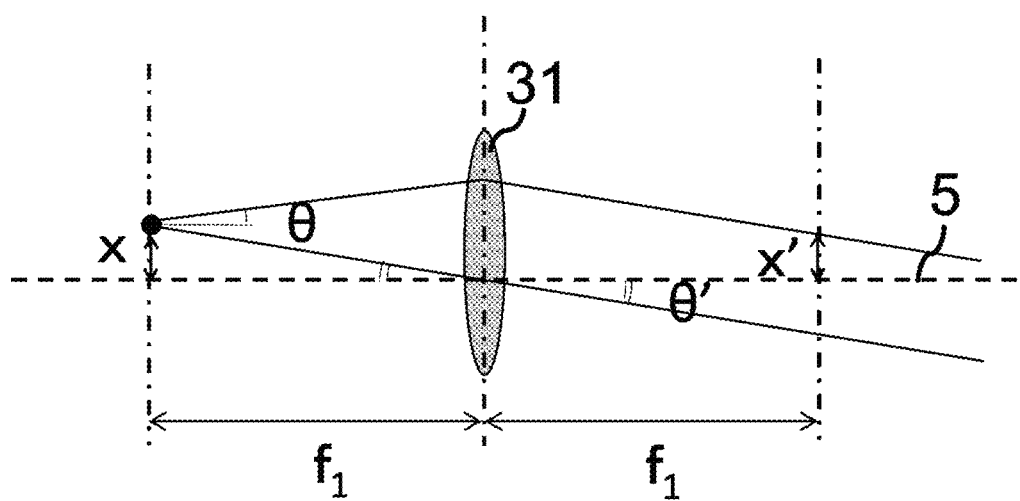
FIG. 3 is a diagram illustrating refraction of light by a lens 31 according to the first embodiment.

For supplementary explanation, the manner in which light is refracted by the lens 31 is illustrated in FIG. 3. A line connecting the position at the distance x from the optical axis 5 and the center 35 of the lens 31 has an angle of θ' with respect to the optical axis 5. The relations of the following formulas are therefore satisfied.

$f_1 \times \tan θ' = x$ $\tan θ' \approx θ'$

Thus, the following formula is satisfied.

$$θ' = x/f_1 \quad (1)$$

In addition, the relations of the following formulas are satisfied.

$x + f_1 θ = x' + f_1 θ'$ $x + f_1 θ = x' + x$

Thus, the following formula is satisfied.

$$x' = f_1 θ \quad (2)$$

In the description above, the relations of the formulas (1) and (2) are used.

In a similar manner, in FIG. 2, the lens 32 converts light at the distance x' from the optical axis at the front-side focal position, into light with an angle of $θ''=x'/f_2$ with respect to the optical axis 5 on the diffractive optical element 2b, and converts light emitted at the angle θ' with respect to the optical axis 5, into light at the distance $x''=θ'f_2$ from the optical axis 5. In other words, by the lens 31 and the lens 32, light at the distance x from the optical axis 5 on the diffractive optical element 2a and emitted at the angle θ with respect to the optical axis 5 is converted into light at the distance $x''=θ'f_2=x(f_2/f_1)$ from the optical axis 5 on the diffractive optical element 2b and with the angle $θ''=x'/f_2=θ(f_1/f_2)$ with respect to the optical axis 5. Thus, the intensity distribution and the phase distribution at the distance x″ on the diffractive optical element 2b are $f_2/f_1$ times the intensity distribution and the phase distribution at the distance x on the diffractive optical element 2a, and the intensity distribution and the phase distribution at the angle θ″ on the diffractive optical element 2b are $f_1/f_2$ times the intensity distribution and the phase distribution at the angle θ on the diffractive optical element 2a. In particular, in a case where the focal distances of the lens 31 and the lens 32 are equal to each other, the intensity distribution and the phase distribution of light at the incidence surface of the diffractive optical element 2b are distributions obtained by transferring the intensity distribution and the phase distribution of light at the emission surface of the diffractive optical element 2a at the same magnification.

While conversion of light with respect to distance in the x-axis direction has been explained herein, the same explanation is also applicable to that in the y-axis direction. Thus, the intensity distribution and the phase distribution can be regarded as distributions of intensity and phase, respectively, of light with respect to the position on a plane (a plane including the x axis and the y axis) perpendicular to the propagating direction of light at the diffractive optical element 2a. The intensity distribution and the phase distribution are distributions generated by conversion of the intensity and the phase of laser light by the diffractive optical element 2a. Note that the diffractive optical element 2a may be configured to convert only either one of the intensity and the phase of laser light. In this case, the lens 31 and the lens 32 transfer the phase distribution of light at the emission surface of the diffractive optical element 2a to the phase distribution of light at the incidence surface of the diffractive optical element 2b.

The configuration of the transfer optical system 3 illustrated in FIG. 2 is one example; the transfer optical system 3 is not limited thereto, and is only required to be any optical system that transfers the intensity distribution and the phase distribution of light at the emission surface of the diffractive optical element 2a to the intensity distribution and the phase distribution of light at the incidence surface of the diffractive optical element 2b. The diffractive optical element 2a and the diffractive optical element 2b are arranged at positions at which the intensity distribution and the phase distribution are transferred on the front side and the rear side of the transfer optical system 3.

Next, operation of generating an optical pattern performed by the optical pattern generation device 100 according to the first embodiment will be explained.

Light emitted from the laser light source 1 is incident on the diffractive optical element 2a.

The diffractive optical element 2a converts the phase of light depending on the position on a plane (a plane including the x axis and the y axis) perpendicular to the propagating direction of light incident on the diffractive optical element 2a (hereinafter referred to as phase modulation). Light emitted from the diffractive optical element 2a is transmitted through the transfer optical system 3 and incident on the diffractive optical element 2b. In this process, the intensity distribution and the phase distribution of light incident on the diffractive optical element 2b are distributions obtained by transferring the intensity distribution and the phase distribution of light at the emission surface of the diffractive optical element 2a by the transfer optical system 3. The diffractive optical element 2b modulates the phase of the light incident on the diffractive optical element 2b. Light emitted from the diffractive optical element 2b propagates and forms an image on the image surface 4. Thus, the light emitted from the laser light source 1 is subjected to phase modulation by the diffractive optical element 2a and the diffractive optical element 2b, propagates, and has, on the image surface 4, an intensity distribution 6a which corresponds to the phase distribution of light at the emission surface of the diffractive optical element 2b.

While the configuration including two diffractive optical elements 2a and 2b and one transfer optical system 3 has been described above, the configuration is not limited thereto and may be a configuration including a plurality of diffractive optical elements and a plurality of transfer optical systems as long as the phase distribution of light at the emission surface of each of the diffractive optical elements is transferred onto the incidence surface of another diffractive optical element on which the light is next incident. In addition, while a case where laser light is subjected to phase modulation by the diffractive optical elements 2a and 2b and has a phase distribution has been described herein, a similar configuration is also applicable to a case where the intensity of laser light is converted and the laser light has an intensity distribution.

In the present embodiment, use of the configuration in which one transfer optical system 3 is disposed between two diffractive optical elements 2a and 2b enables the phase distribution of light at the emission surface of the diffractive optical element 2a to be transferred to the phase distribution of light at the incidence surface of the diffractive optical element 2b. In the optical pattern generation device of the related art, the irregularity pattern on the surface of the second diffractive optical element needs to be designed depending on the distribution of light incident on the second diffractive optical element in view of a change in a wavefront after propagation of light emitted from the first diffractive optical element. In contrast, in the optical pattern generation device 100 according to the present embodiment, the second diffractive optical element 2b can be designed without consideration of a change in a wavefront due to propagation from the first diffractive optical element 2a. This produces advantages of simpler design and manufacture of diffractive optical elements than in the related art.

Next, another advantageous effect of the first embodiment obtained by using the diffractive optical elements 2a and 2b and the transfer optical system 3 will be explained with reference to FIG. 4, the effect of enabling phase modulation of light with more number of gradations than that of one diffractive optical element even though the diffractive optical elements 2a and 2b each have a surface pattern with a small number of gradations.

Figure 4A:
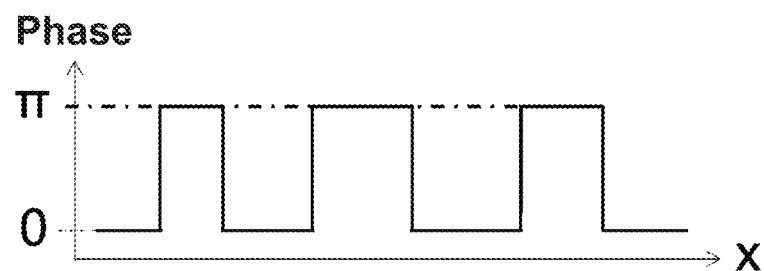
FIG. 4 illustrates an example of phase distributions of phase modulation performed by diffractive optical elements 2a and 2b according to the first embodiment.
Figure 4B:
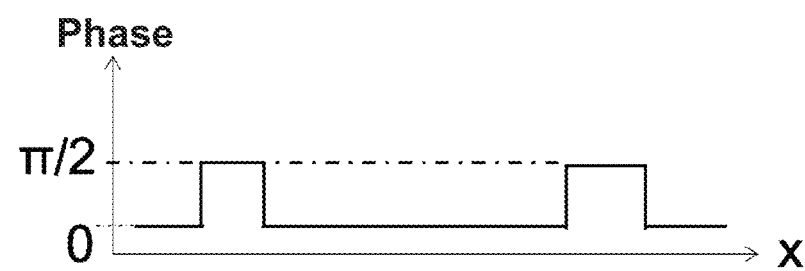
Figure 4C:
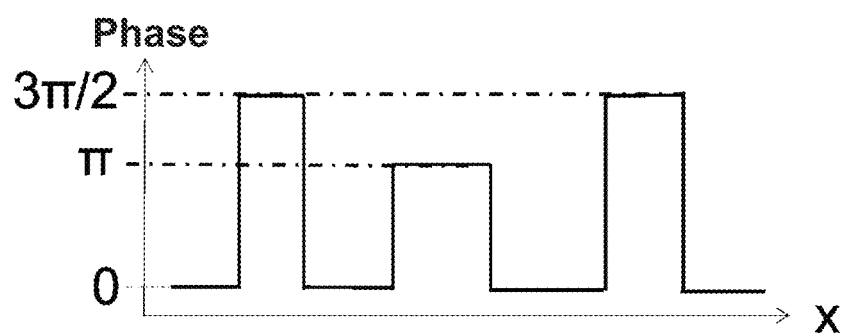

For example, in a case where the phase distribution modulated by the diffractive optical element 2a is a distribution illustrated in FIG. 4A and the phase distribution modulated by the diffractive optical element 2b is a distribution illustrated in FIG. 4B, light incident on the diffractive optical element 2a is subjected to phase modulation in the two-gradation distribution illustrated in FIG. 4A by the diffractive optical element 2a. Light emitted from the diffractive optical element 2a is transmitted through the transfer optical system 3 and incident on the diffractive optical element 2b. The phase distribution at the incidence surface of the diffractive optical element 2b is further subjected to phase modulation in the two-gradation distribution illustrated in FIG. 4B by the diffractive optical element 2b. The light emitted from the laser light source 1 is thus subjected to phase modulation by the diffractive optical element 2a and the diffractive optical element 2b. As illustrated in FIG. 4C, the phase distribution of light at the emission surface of the diffractive optical element 2b is a three-gradation phase distribution that is the sum of the two-gradation distribution of the diffractive optical element 2a and the two-gradation distribution of the diffractive optical element 2b. Thus, the number of gradations of the phase of the laser light emitted from the diffractive optical element 2b is larger than that of a phase change of laser light applied by each of the diffractive optical elements 2a and 2b.

As described above, the configuration including two diffractive optical elements 2a and 2b of two gradations and one transfer optical system 3 is capable of generating a three-gradation phase distribution of light and increasing the number of gradations, by using the diffractive optical elements 2a and 2b of two gradations that are easily manufactured at low cost. This results in an advantageous effect of generating highly accurate optical patterns.

While the configuration including two diffractive optical elements 2a and 2b of two gradations and one transfer optical system 3 is explained in FIG. 4, use of a configuration including n diffractive optical elements (n is an integer equal to or more than 2) of two gradations and (n−1) transfer optical systems each being arranged between corresponding two of the diffractive optical elements, enables generation of an (n+1)-gradation phase distribution.

Next, another advantageous effect of the first embodiment obtained by using the diffractive optical elements 2a and 2b and the transfer optical system 3 will be explained with reference to FIG. 5, the effect of enabling generation of a phase distribution for a larger number of pixels than that of an optical pattern generated by using one diffractive optical element. Note that pixels are used as the smallest units constituting an image formed by the generated optical pattern.

For example, a case where the phase distribution modulated by the diffractive optical element 2a is a distribution illustrated in FIG. 5A and the phase distribution modulated by the diffractive optical element 2b is a distribution illustrated in FIG. 5B will be explained. Note that the diffractive optical elements 2a and 2b have the same surface patterns as the phase distributions of the diffractive optical elements 2a and 2b illustrated in FIGS. 5A and 5B, respectively. Specifically, in FIGS. 5A and 5B, the distribution of projections of the first diffractive optical element 2a and that of the second diffractive optical element 2b are shifted relative to each other within the plane perpendicular to the propagating direction of incident laser light.

Figure 5A:
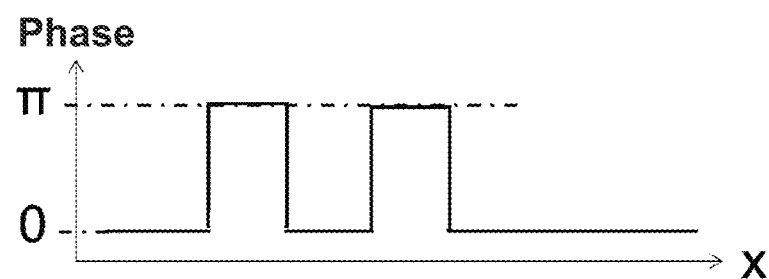
FIG. 5 illustrates an example of phase distributions of phase modulation performed by the diffractive optical elements 2a and 2b according to the first embodiment.
Figure 5B:
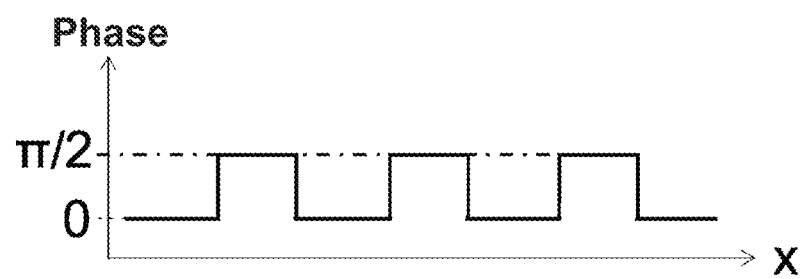
Figure 5C:
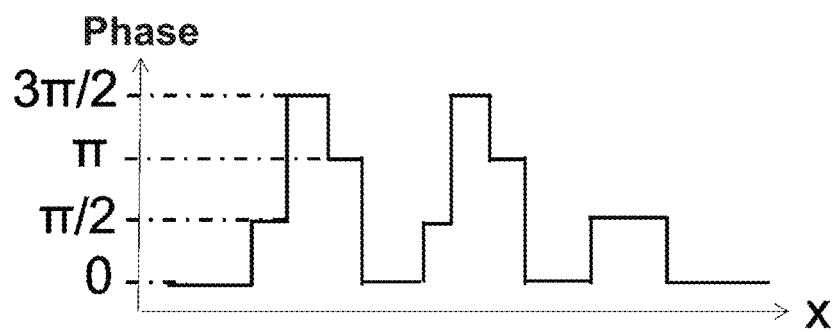

In this case, light incident on the diffractive optical element 2a is subjected to phase modulation in two gradations by the surface pattern of the diffractive optical element 2a illustrated in FIG. 5A. Light emitted from the diffractive optical element 2a is transmitted through the transfer optical system 3, and then incident on the diffractive optical element 2b. The phase distribution of light at the incidence surface of the diffractive optical element 2b is the phase distribution of light at the emission surface of the diffractive optical element 2a. Light incident on the diffractive optical element 2b is further subjected to phase modulation in two gradations by the surface pattern of the diffractive optical element 2b illustrated in FIG. 5B. Because light emitted from the laser light source 1 is subjected to phase modulation by the diffractive optical element 2a and the diffractive optical element 2b, the phase distribution of light at the emission surface of the diffractive optical element 2b is a four-gradation phase distribution that is the sum of the two-gradation distribution of the diffractive optical element 2a and the two-gradation distribution of the diffractive optical element 2b as illustrated in FIG. 5C. Because the projection patterns of the diffractive optical elements 2a and 2b are shifted from each other, an irregularity pattern with a finer pitch than the pixel pitch of one diffractive optical element can be generated, and a phase distribution for a still larger number of pixels than the number of pixels of an optical pattern generated by using one diffractive optical element can be generated. Specifically, because the position of phase modulation by the irregularity pattern performed by the diffractive optical element 2a and the position of phase modulation by the irregularity pattern performed by the diffractive optical element 2b are different from each other, the phase of laser light emitted from the diffractive optical element 2a can be changed in still finer units in laser light emitted from the diffractive optical element 2b.

While the configuration including two diffractive optical elements 2a and 2b of two gradations and one transfer optical system 3 is explained in FIG. 5, any configuration including n diffractive optical elements (n is an integer equal to or more than 2) with distributions of irregularity patterns on their respective surfaces being shifted from each other and (n−1) transfer optical systems each being arranged between corresponding two of the diffractive optical elements, can generate a phase distribution for a larger number of pixels than that of an optical pattern generated by using one diffractive optical element. This results in an advantageous effect of generating highly accurate optical patterns.

In general, for making an image generated by a diffractive optical element more accurate, pixels of a surface irregularity pattern of the diffractive optical element needs to be finer and multivalued. In the related art, for achieving multiple values by one diffractive optical element, the diffractive optical element needs to be subjected to a plurality of forming processes, which increases costs and reduces the accuracy. In contrast, in the present embodiment, light can be subjected to phase modulation in a larger number of gradations than the number of gradations of the diffractive optical elements 2a and 2b, and more accurate optical patterns can be generated at lower costs than in the related art.

As described above, according to the first embodiment, the two diffractive optical elements 2a and 2b and the transfer optical system 3 between the two diffractive optical elements 2a and 2b are provided, which enables generation of an optical pattern on the image surface 4, the optical pattern corresponding to the phase distribution of light obtained by spatial phase modulation by the two diffractive optical elements 2a and 2b. Thus, use of the two diffractive optical elements 2a and 2b and the transfer optical system 3 enables the phase distribution of light at the emission surface of the diffractive optical element 2a to be further subjected to phase modulation by the diffractive optical element 2b. For example, in a case where the diffractive optical element 2a and the diffractive optical element 2b have surface patterns in two gradations, the phase distribution of light in two gradations obtained by modulation by the diffractive optical element 2a can further be modulated in two gradations by the diffractive optical element 2b. As a result, the phase distribution of laser light emitted from the laser light source 1 at the emission surface of the diffractive optical element 2b can be a phase distribution in three or more gradations.

While the configuration including two diffractive optical elements 2a and 2b and one transfer optical system 3 has been described above, the configuration is not limited thereto and may be a configuration including a plurality of diffractive optical elements and a plurality of transfer optical systems as long as the phase distribution of light at the emission surface of each of the diffractive optical elements is transferred onto the incidence surface of another diffractive optical element on which the light is next incident.

In addition, while the configuration including two diffractive optical elements 2a and 2b of two gradations is presented as an example herein, the number of gradations is not limited. When the number of diffractive optical elements is more than one, similar effects are produced on increase in values and pixels.

As described above, the optical pattern generation device 100 according to the present embodiment includes: the first laser light source 1 for emitting first laser light; the first diffractive optical element 2a for changing the phase of the first laser light depending on the position on a plane perpendicular to the propagating direction of the first laser light and emitting laser light having a phase distribution; the second diffractive optical element 2b for changing the phase of incident laser light depending on the position on a plane perpendicular to the propagating direction of the incident laser light and emitting laser light for forming an optical pattern; and the transfer optical system 3 disposed between the first and second diffractive optical elements 2a and 2b, for transferring the phase distribution of laser light emitted from the first diffractive optical element to the phase distribution of laser light incident on the second diffractive optical element 2b. This configuration enables the second diffractive optical element 2b to be simply designed without consideration of a change in a wavefront due to propagation of light emitted from the first diffractive optical element 2a.

In addition, in the optical pattern generation device 100 according to the present embodiment, the first diffractive optical element 2a changes the intensity of the first laser light depending on the position on the plane perpendicular to the propagating direction of the first laser light, and the transfer optical system 3 transfers the intensity distribution of the laser light whose intensity is changed by the first diffractive optical element 2a to the intensity distribution of laser light incident on the second diffractive optical element 2b. This configuration enables the second diffractive optical element 2b to be simply designed without consideration of a change in a wavefront due to propagation of light emitted from the first diffractive optical element 2a, even in a case where the laser light emitted from the first diffractive optical element 2a has an intensity distribution.

In addition, in the optical pattern generation device 100 according to the present embodiment, the number of gradations of the phase of the laser light emitted from the second diffractive optical element 2b is larger than that of a phase change of laser light applied by each of the first and second diffractive optical elements 2a and 2b. This configuration enables phase modulation of laser light with a larger number of gradations than that of each of the diffractive optical elements 2a and 2b by using the diffractive optical elements 2a and 2b with a small number of gradations.

In addition, in the optical pattern generation device 100 according to the present embodiment, in the laser light emitted from the second diffractive optical element 2b, the position where the phase is changed by the change in phase performed by the first diffractive optical element 2a and the position where the phase is changed by the change in phase performed by the second diffractive optical element 2b are different. This configuration enables phase distribution to be generated with a larger number of pixels than that of an optical pattern generated by using one diffractive optical element.

In addition, the optical pattern generation device 100 according to the present embodiment includes: the first laser light source 1 for emitting laser light; the first to N-th diffractive optical elements (N is an integer equal to or more than 2) each for changing the phase of incident laser light depending on the position on the plane perpendicular to the propagating direction of the incident laser light and emitting laser light having a phase distribution; n transfer optical systems (n=1, . . . , N−1) each arranged between the n-th diffractive optical element and the (n+1)-th diffractive optical element, for transferring the phase distribution of laser light emitted from the n-th diffractive optical element to the phase distribution of laser light incident on the (n+1)-th diffractive optical element, in which the laser light emitted from the first laser light source is incident on the first diffractive optical element, and laser light whose phase is changed by the N-th diffractive optical element is laser light that forms an optical pattern. This configuration enables the individual diffractive optical elements to be designed without consideration of a change in a wavefront due to propagation of light emitted from the diffractive optical elements. Furthermore, use of a large number of diffractive optical elements enables phase modulation with a large number of gradations on laser light that forms an optical pattern.

Second Embodiment

While two diffractive optical elements 2a and 2b are arranged on the optical axis 5 in the first embodiment, in a second embodiment, two diffractive optical elements 2a and 2b can be arranged on and displaced from the optical axis and a case where either one of the diffractive optical elements 2a and 2b is not arranged on the optical axis 5 is included.

Figure 6:
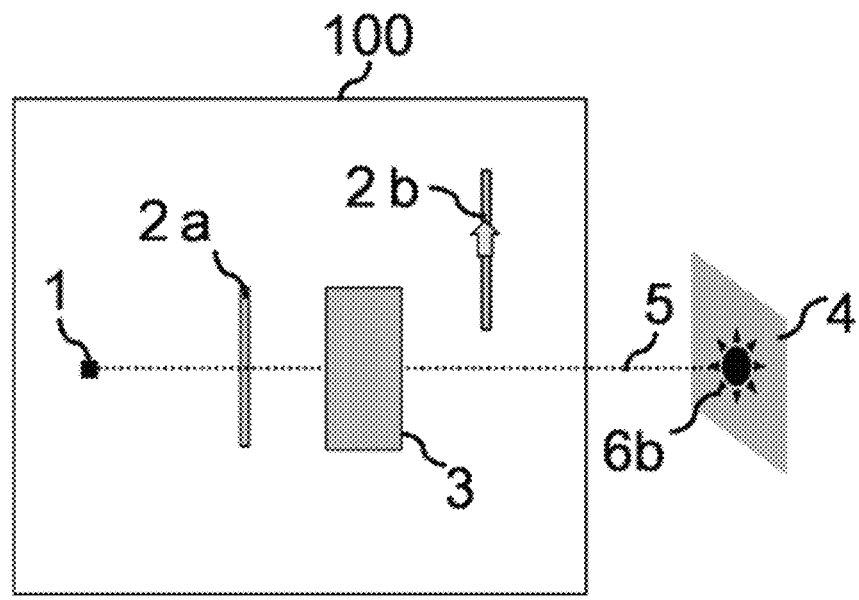
FIG. 6 illustrates an example of a configuration of an optical pattern generation device 100 according to a second embodiment.
Figure 7:
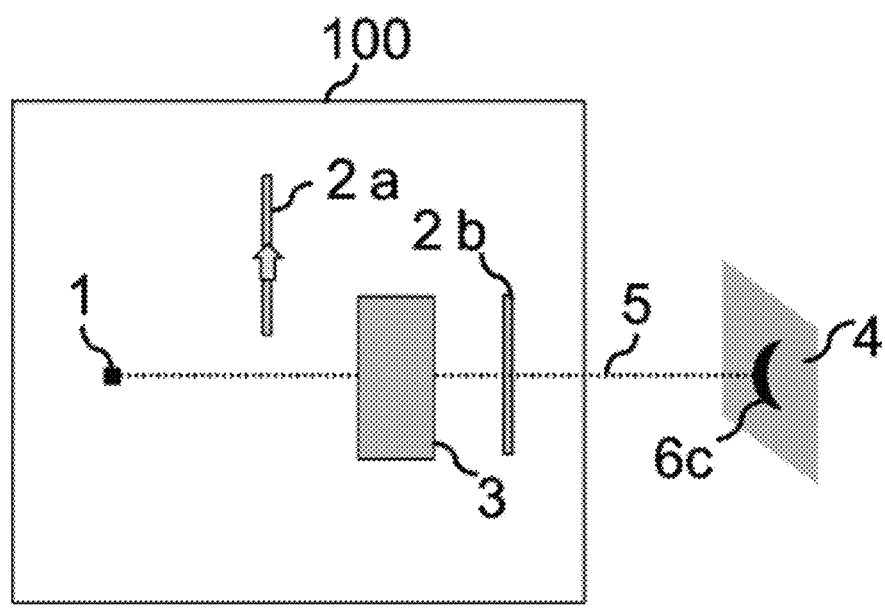
FIG. 7 illustrates an example of a configuration of the optical pattern generation device 100 according to the second embodiment.

FIGS. 6 and 7 are diagrams illustrating examples of a configuration of an optical pattern generation device 100 according to the second embodiment. The diffractive optical element 2a is positioned between the laser light source 1 and the transfer optical system 3, and moves in a direction perpendicular to the optical axis 5. The diffractive optical element 2b is positioned between the transfer optical system 3 and the image surface 4, and moves in a direction perpendicular to the optical axis 5. The movement displaces either one of the first and second diffractive optical elements 2a and 2b from the optical path through which laser light emitted from the laser light source 1 passes before forming an optical pattern. Thus, the optical pattern generation device 100 according to the second embodiment has a configuration in which either one of the diffractive optical elements 2a and 2b can be moved to be displaced from the optical path through which laser light emitted from the laser light source 1 passes before forming an optical pattern.

Operation of the optical pattern generation device 100 according to the second embodiment will now be explained.

FIG. 6 is different from the configuration in FIG. 1 in that the diffractive optical element 2b is not on the optical axis 5. Light emitted from the laser light source 1 is incident on the diffractive optical element 2a. Light incident on the diffractive optical element 2a is subjected to phase modulation by the diffractive optical element 2a. The phase distribution and the intensity distribution of light at the emission surface of the diffractive optical element 2a are transferred by the transfer optical system 3 to the position corresponding to the position where the diffractive optical element 2b is arranged in FIG. 1. The transferred light propagates, and has, on the image surface 4, an intensity distribution 6b which corresponds to the phase distribution of light at the emission surface of the diffractive optical element 2a.

FIG. 7 is different from the configuration in FIG. 1 in that the diffractive optical element 2a is not on the optical axis 5. Light emitted from the laser light source 1 is incident on the transfer optical system 3. The transfer optical system 3 transfers the intensity distribution and the phase distribution of light at the position corresponding to the position where the diffractive optical element 2a is arranged in FIG. 1 to the incidence surface of the diffractive optical element 2b. The light incident on the diffractive optical element 2b is subjected to phase modulation by the diffractive optical element 2b. Light emitted from the diffractive optical element 2b propagates, and has, on the image surface 4, an intensity distribution 6c which corresponds to the phase distribution of light at the emission surface of the diffractive optical element 2b.

Next, advantageous effects of the optical pattern generation device 100 according to the second embodiment will be explained.

Because the distances from the emission surfaces of the diffractive optical elements to the image surface 4 are different depending on the positions where the respective diffractive optical elements 2a and 2b are arranged, the phase distributions obtained by the diffractive optical elements 2a and 2b need to be changed depending on the positions where the diffractive optical elements 2a and 2b are arranged in the related art in which the transfer optical system 3 is not included.

In contrast, with the optical pattern generation device 100 according to the second embodiment, the transfer optical system 3 is used, which enables an optical pattern to be generated on the image surface 4 even in a case where the distances from the emission surfaces of the diffractive optical elements to the image surface 4 are different such as a case where light emitted from the laser light source 1 is transmitted through two diffractive optical elements 2a and 2b, a case where the light is transmitted only through the diffractive optical element 2a, and a case where the light is transmitted only through the diffractive optical element 2b. Thus, images of three patterns can be generated by the two diffractive optical elements 2a and 2b.

As described above, according to the second embodiment, the configuration including two diffractive optical elements 2a and 2b that can be inserted on and removed from the optical axis 5, and the transfer optical system 3 between the diffractive optical elements 2a and 2b is used, which enables irradiation in different patterns on the image surface 4 in the cases where light emitted from the laser light source 1 is transmitted only through the diffractive optical element 2a, the light is transmitted only through the diffractive optical element 2b, and the light is transmitted through both the diffractive optical element 2a and the diffractive optical element 2b. An effect of enabling generation of images of three optical patterns by two diffractive optical elements 2a and 2b is thus produced.

While the configuration including two diffractive optical elements 2a and 2b and one transfer optical system 3 has been described above, the configuration is not limited thereto and may be a configuration including n diffractive optical elements (n is an integer equal to or more than 2) of two gradations and (n−1) transfer optical systems each being arranged between corresponding two of the diffractive optical elements as long as the phase distribution at the emission surface of each of the diffractive optical elements is transferred onto the incidence surface of another diffractive optical element. In the case of the configuration including n diffractive optical elements and (n−1) transfer optical systems, $\Sigma(k=1,n)nCk$ optical patterns can be generated.

Note that, in the case of the optical pattern generation device of the related art including one diffractive optical element, diffractive optical elements having different surface irregularity patterns are needed for different respective patterns or different respective wavelengths of light sources. In this case, one diffractive optical element is need for one pattern, and the number of components thus increases as the patterns increases. In contrast, the optical pattern generation device 100 according to the present embodiment is capable of generating more kinds of patterns than the number of diffractive optical elements, which enables more accurate optical patterns to be generated at lower costs than those in the related art.

Thus, the optical pattern generation device 100 according to the present embodiment is characterized in that either one of the first and second diffractive optical elements 2a and 2b can be moved to be displaced from the optical path through which the first laser light passes before forming an optical pattern. This configuration produces an effect of enabling generation of images of three optical patterns by two diffractive optical elements 2a and 2b.

Third Embodiment

While a mode in which a pattern is formed by using one laser light source 1 has been described in the second embodiment, in a third embodiment, a mode in which a pattern is formed by using two laser light sources will be described.

Figure 8:
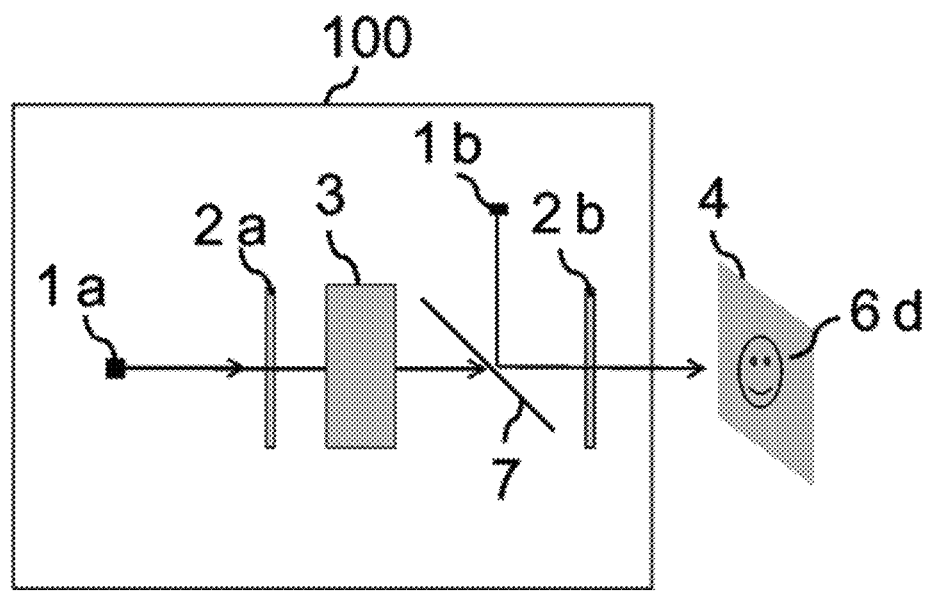
FIG. 8 illustrates an example of a configuration of an optical pattern generation device 100 according to a third embodiment.
Figure 9:
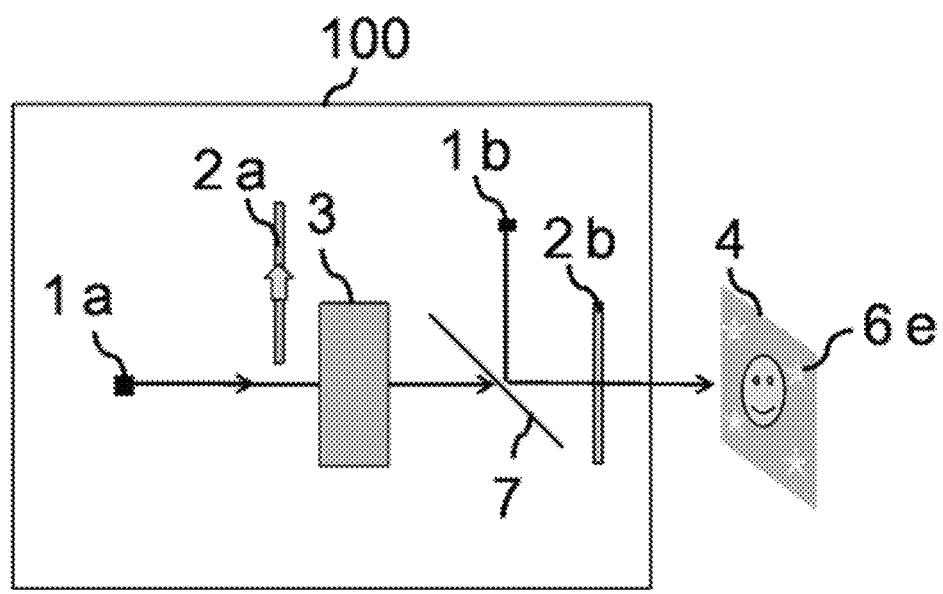
FIG. 9 illustrates an example of a configuration of the optical pattern generation device 100 according to the third embodiment.
Figure 10:
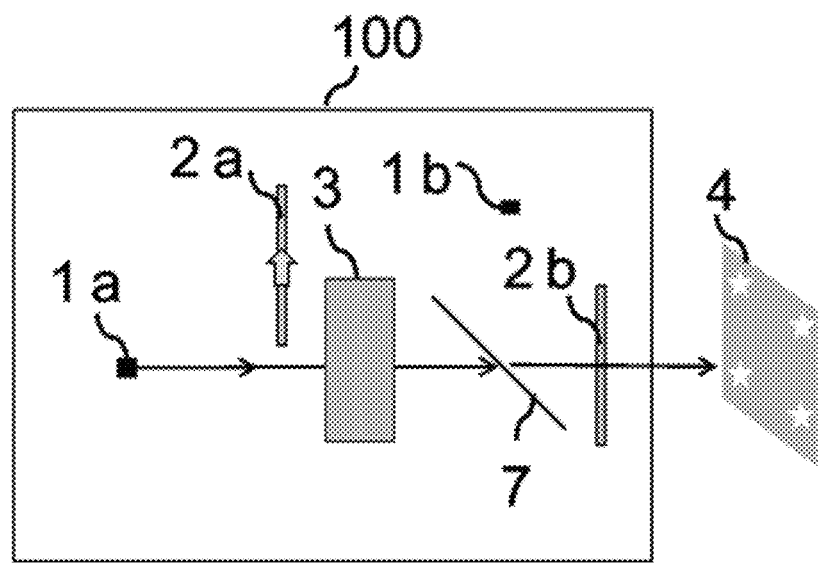
FIG. 10 illustrates an example of a configuration of the optical pattern generation device 100 according to the third embodiment.

FIGS. 8 to 10 are diagrams illustrating examples of a configuration of an optical pattern generation device 100 according to the third embodiment. The third embodiment is different from the second embodiment in that two laser light sources 1a and 1b are used and that a mirror 7 is provided between the transfer optical system 3 and the diffractive optical element 2b.

The laser light source 1b is a light source that emits single-wavelength laser light. For the laser light source 1b, a semiconductor laser, a fiber laser, or a solid-state laser is used, for example. The wavelength of light emitted by the laser light source 1b may be the same as or different from that of light emitted by the laser light source 1a.

The mirror 7 is an optical component that transmits some incident light and reflects some incident light. An example of the mirror 7 is a beam splitter.

The laser light source 1b is arranged at a certain position so that light emitted by the laser light source 1b is incident on the emission surface of the mirror 7 from which light emitted from the laser light source 1a is emitted. In addition, the mirror 7 is disposed between the transfer optical system 3 and the diffractive optical element 2b.

Next, operation of the optical pattern generation device 100 according to the third embodiment will be described.

Light emitted from the laser light source 1b is incident on the mirror 7. The light emitted from the laser light source 1b and incident on the mirror 7 is reflected by the surface of the mirror 7 and incident on the diffractive optical element 2b. The light incident on the diffractive optical element 2b is subjected to phase modulation, and emitted as a pattern onto the image surface 4.

Light emitted from the laser light source 1a is incident on the diffractive optical element 2a. The light incident on the diffractive optical element 2a is subjected to phase modulation and emitted by the diffractive optical element 2a. The light emitted from the diffractive optical element 2a is transmitted through the transfer optical system 3 and the mirror 7, and incident on the diffractive optical element 2b.

The light incident on the diffractive optical element 2b is subjected to phase modulation, and emitted as a pattern onto the image surface 4.

Next, advantageous effects of the third embodiment will be explained with reference to FIGS. 8 to 10.

In the configuration of FIG. 8, light emitted from the laser light source 1a is subjected to phase modulation by the diffractive optical element 2a, and the distribution of light at the emission surface of the diffractive optical element 2a is transferred by the transfer optical system 3 onto the incidence surface of the diffractive optical element 2b. Light incident on the diffractive optical element 2b is modulated by the diffractive optical element 2b, transmitted through the mirror 7, and forms a pattern on the image surface 4.

For example, in a case where the color of light emitted from the laser light source 1a and the color of light emitted from the laser light source 1b are different from each other and where the pattern on the image surface 4 formed by the light emitted from the laser light source 1a and the pattern on the image surface 4 formed by the light emitted from the laser light source 1b are the same, the color of the pattern on the image surface 4 is a color obtained by additive mixing of the color of the laser light source 1a and the color of the laser light source 1b. In addition, adjustment of an output value from the laser light source 1a and an output value from the laser light source 1b enables generation of at least one pattern with multiple colors.

Thus, use of the laser light source 1a and the laser light source 1b and provision of the mirror 7 between the transfer optical system 3 and the diffractive optical element 2b enable generation of at least one pattern with multiple colors.

In addition, as illustrated in FIGS. 9 and 10, when the diffractive optical element 2a is displaced from the optical axis 5, light emitted from the laser light source 1a is transmitted through the transfer optical system 3 and the mirror 7, and incident on the diffractive optical element 2b. The incident light is subjected to phase modulation by the diffractive optical element 2b. Light emitted from the diffractive optical element 2b forms a pattern 6e, on the image surface 4, obtained by the phase modulation by the diffractive optical element 2b.

Figure 11:
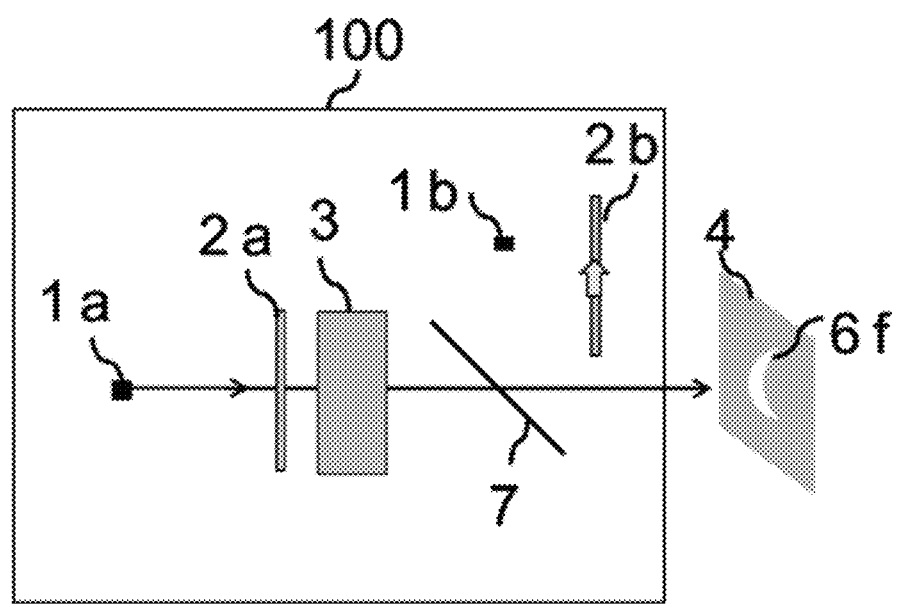
FIG. 11 illustrates an example of a configuration of the optical pattern generation device 100 according to the third embodiment.

Furthermore, as illustrated in FIG. 11, when the diffractive optical element 2b is displaced from the optical axis 5, light emitted from the laser light source 1a is incident on the diffractive optical element 2a, and the incident light is subjected to phase modulation by the diffractive optical element 2a. Light emitted from the diffractive optical element 2a is transmitted through the transfer optical system 3 and the mirror 7, and forms a pattern 6f, on the image surface 4, obtained by the phase modulation by the diffractive optical element 2a.

Thus, use of the laser light source 1a and the laser light source 1b and provision of the mirror 7 between the transfer optical system 3 and the diffractive optical element 2b enable four kinds of patterns to be generated by two diffractive optical elements 2a and 2b and two laser light sources.

Furthermore, display of the four kinds of patterns generated by the optical pattern generation device 100 of the third embodiment while continuously switching between the patterns enables the patterns to be animated.

The optical pattern generation device 100 of the third embodiment having the configuration as described above in which the laser light source 1a and the laser light source 1b are used and the mirror 7 is provided between the transfer optical system 3 and the diffractive optical element 2b also produces effects similar to those in the first and second embodiments. Additionally, the optical pattern generation device 100 of the third embodiment in which the laser light source 1a and the laser light source 1b are used and the mirror 7 is provided between the transfer optical system 3 and the diffractive optical element 2b produces an effect of enabling generation of at least one pattern with multiple colors. Furthermore, four kinds of patterns can be generated by two diffractive optical elements 2a and 2b and two laser light sources 1a and 1b. Furthermore, display of the four kinds of patterns while continuously switching between the patterns produces an effect of enabling the patterns to be animated.

While the configuration including two laser light sources 1a and 1b, two diffractive optical elements 2a and 2b, one transfer optical system 3, and one mirror 7 has been described above, the configuration is not limited thereto and may be a configuration including a plurality of laser light sources, a plurality of diffractive optical elements, a plurality of transfer optical systems, and a plurality of mirrors as long as the phase distribution at the emission surface of each of the diffractive optical elements is transferred onto the incidence surface of another diffractive optical element.

As described above, the optical pattern generation device 100 according to the present embodiment includes: the second laser light source 1b for emitting second laser light; and the mirror 7 for transmitting laser light which is to be incident on the second diffractive optical element and onto which the phase distribution is transferred by the transfer optical system 3, and reflecting the second laser light, in which the second diffractive optical element 2b changes the phase of laser light reflected by the mirror 7 depending on the position on a plane perpendicular to the propagating direction of laser light reflected by the mirror 7, and emits laser light that form an optical pattern different from that formed by the first laser light. This configuration enables generation of at least one optical pattern with multiple colors in a case where the color of light emitted from the laser light source 1a and the color of light emitted from the laser light source 1b are different from each other.

In addition, in the optical pattern generation device 100 according to the present embodiment, the second laser light has a wavelength different from that of the first laser light. This configuration enables the color of light emitted from the laser light source 1a and the color of light emitted from the laser light source 1b to be different from each other.

In addition, in the optical pattern generation device 100 according to the present embodiment, either one of the first and second diffractive optical elements 2a and 2b can be moved to be displaced from the optical path through which the first laser light passes before forming an optical pattern. This configuration produces an effect of enabling the four kinds of patterns to be animated by displaying the patterns while continuously switching between the patterns.

In addition, the optical pattern generation device 100 according to the present embodiment includes: first to N-th laser light sources for emitting first to N-th respective pieces of laser light; first to N-th diffractive optical elements (N is an integer equal to or more than 2) each for changing the phase of incident laser light depending on the position on the plane perpendicular to the propagating direction of the incident laser light, and emitting laser light having a phase distribution; n transfer optical systems (n=1, . . . , N−1) each arranged between the n-th diffractive optical element and the (n+1)-th diffractive optical element, for transferring the phase distribution of laser light emitted from the n-th diffractive optical element to the phase distribution of laser light incident on the (n+1)-th diffractive optical element; and n mirrors (n=1, . . . , N−1) each for transmitting laser light which is to be incident on the (n+1)-th diffractive optical element and onto which the phase distribution is transferred by the n-th transfer optical system and reflecting laser light emitted from the (n+1)-th laser light source to make the laser light incident on the (n+1)-th diffractive optical element, in which laser light emitted from the first laser light source is incident on the first diffractive optical element, and laser light whose phase is changed by the N-th diffractive optical element is laser light for forming an optical pattern. This configuration produces an effect of enabling a number of patterns to be animated by displaying the patterns while continuously switching between the patterns.

REFERENCE SIGNS LIST 1, 1a, 1b: laser light source, 2a, 2b: diffractive optical element, 3: transfer optical system, 4: image surface, 5: optical axis, 6a, 6b, 6c, 6d, 6e, 6f: optical pattern, 7: mirror, 31, 32: lens, 100: optical pattern generation device.

The invention claimed is:

1. An optical pattern generation device comprising:
a first laser light source to emit first laser light;
a first diffractive optical element to change a phase of the first laser light depending on a position on a plane perpendicular to a propagating direction of the first laser light, and emit laser light having a phase distribution;
a second diffractive optical element to change a phase of incident laser light depending on a position on a plane perpendicular to a propagating direction of the incident laser light, and emit laser light for forming an optical pattern; and
a transfer optical system disposed between the first and second diffractive optical elements, to transfer the phase distribution of the laser light emitted from the first diffractive optical element to a phase distribution of laser light incident on the second diffractive optical element, and wherein
the number of gradations of the phase of the laser light emitted from the second diffractive optical element is larger than the number of gradations of a phase change of laser light applied by each of the first and second diffractive optical elements, characterized in that
the optical pattern generation device further comprises:
a second laser light source to emit second laser light; and
a mirror to transmit laser light which is to be incident on the second diffractive optical element and onto which the phase distribution is transferred by the transfer optical system, and reflect the second laser light, wherein
the second diffractive optical element changes a phase of the laser light reflected by the mirror depending on a position on a plane perpendicular to a propagating direction of the laser light reflected by the mirror, and emits laser light for forming an optical pattern different from an optical pattern formed by the first laser light.

2. The optical pattern generation device according to claim 1, wherein the first diffractive optical element changes an intensity of the first laser light depending on the position on the plane perpendicular to the propagating direction of the first laser light, and
the transfer optical system transfers an intensity distribution of the laser light whose intensity is changed by the first diffractive optical element to an intensity distribution of laser light incident on the second diffractive optical element.

3. The optical pattern generation device according to claim 1, wherein in the laser light emitted from the second diffractive optical element, a position where the phase is changed by a change in phase performed by the first diffractive optical element and a position where the phase is changed by a change in phase performed by the second diffractive optical element are different from each other.

4. The optical pattern generation device according to claim 1, wherein
the second laser light has a wavelength different from that of the first laser light.

5. The optical pattern generation device according to claim 1, wherein either one of the first and second diffractive optical elements is movable to be displaced from an optical path through which the first laser light passes before forming an optical pattern.

6. An optical pattern generation device comprising:
a first laser light source to emit laser light;
first to N-th diffractive optical elements (N is an integer equal to or more than 2) each to change a phase of incident laser light depending on a position on a plane perpendicular to a propagating direction of the incident laser light, and emit laser light having a phase distribution; and
n transfer optical systems (n=1, . . . , N−1) each arranged between the n-th diffractive optical element and the (n+1)-th diffractive optical element, to transfer a phase distribution of laser light emitted from the n-th diffractive optical element to a phase distribution of laser light incident on the (n+1)-th diffractive optical element, wherein
the laser light emitted from the first laser light source is incident on the first diffractive optical element, and
laser light emitted from the N-th diffractive optical element is laser light for forming an optical pattern, and wherein
the number of gradations of the phase of the laser light emitted from the N-th diffractive optical element is larger than the number of gradations of a phase change of laser light applied by each of the first to N-th diffractive optical elements, characterized in that
the optical pattern generation device further comprises:
second to N-th laser light sources each for emitting laser light; and
n mirrors (n=1 . . . , N−1) each for transmitting laser light which is to be incident on the (n+1)-th diffractive optical element and onto which a phase distribution is transferred by the n-th transfer optical system and reflecting laser light emitted from the (n+1)-th laser light source to make the laser light incident on the (n+1)-th diffractive optical element.

* * * * *